B. C. LORING.
TWO-POINT SUSPENSION FOR AUTOMOBILES.
APPLICATION FILED MAY 11, 1912.
1,186,013.
Patented June 6, 1916.
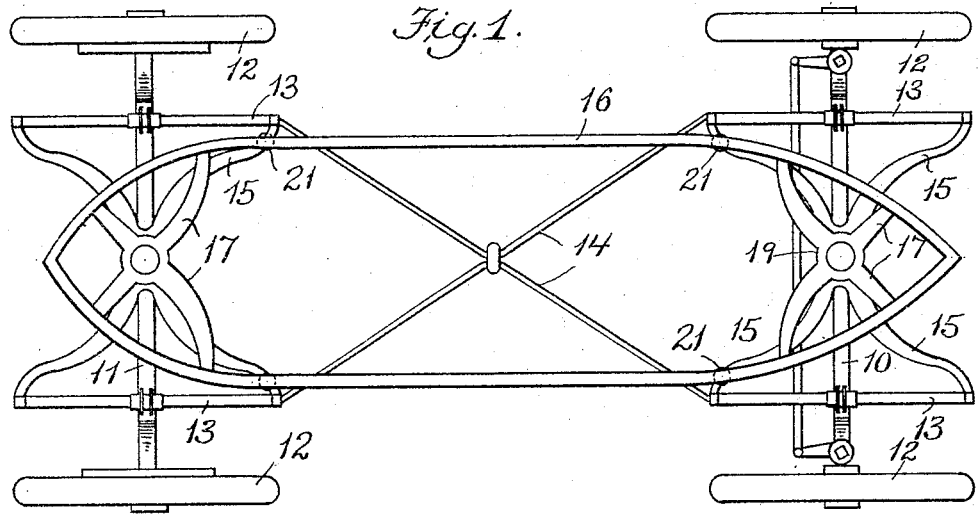
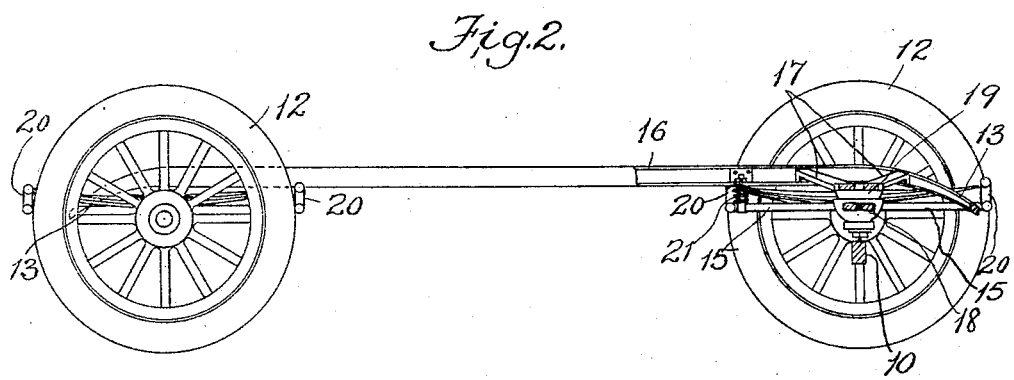
Witnesses:
Inventor:
B. C. Loring
Attys

UNITED STATES PATENT OFFICE.

BENJAMIN C. LORING, OF PROVIDENCE, RHODE ISLAND, ASSIGNOR TO JAMES TILLINGHAST, TRUSTEE, OF PROVIDENCE, RHODE ISLAND.

TWO-POINT SUSPENSION FOR AUTOMOBILES.

1,186,013.  Specification of Letters Patent.  Patented June 6, 1916.

Application filed May 11, 1912. Serial No. 696,740.

*To all whom it may concern:*

Be it known that I, BENJAMIN C. LORING, a citizen of the United States, and a resident of Providence, in the county of Providence and State of Rhode Island, have invented certain new and useful Improvements in Two-Point Suspension for Automobiles, of which the following is a specification.

This invention relates to vehicles and especially to the means for supporting or suspending the body or motor frame relatively to the axles, and the object of the invention is to provide a construction which will render it impossible to warp or twist the frame when the vehicle is moving over an uneven road-way.

To this end the invention consists in the improvements which I will now proceed to describe and claim.

Of the accompanying drawings: Figure 1 is a plan view of so much of a vehicle embodying my improvements as is necessary to illustrate the invention. Fig. 2 is a side elevation, partly in longitudinal section.

The same reference characters indicate the same parts in both of the figures.

It is to be understood that I do not attempt to illustrate the details of such parts of the vehicle or mechanism as are old and well known, preferring to avoid confusion by illustrating only such portion or portions of the complete vehicle as include my improvements or are immediately connected therewith. The front axle 10 and rear axle 11 carry wheels 12, as usual, the front wheels being mounted to swing relatively to the axle for steering purposes in any ordinary or preferred manner.

Carried by the front and rear axles are the main supporting side springs 13 which are or may be connected by brace rods 14, each pair of front springs 13 and rear springs 13 supporting a spider or yoke 15, the connections between said springs and spiders being such as indicated at 20 in Fig. 2. The body frame 16 has at its front and rear a spider or yoke 17 which is above the spider or yoke 15. The center member 18 of the spider 15 and the center member 19 of the spider 17 having a rocking connection as by means of a ball and socket joint. The simple connection between the two spiders may, however, be any other form that may be preferred so long as it will permit a lateral relative rocking movement.

It will now be understood that if the vehicle is traveling over an uneven road, either wheel may be raised considerably above the plane of the other wheels without imparting any torsional strain to the body frame 16, although said body is spring-supported, because the springs 13 are interposed between the axles and the lower spiders 15, it being impossible to impart any twisting strain to the frame 16 because the latter is capable of rocking laterally on two points which are in turn supported by the lower spiders.

To hold the body frame 16 in proper horizontal or balanced position, suitable springs are employed such as illustrated at 21, said springs being connected at their upper ends to the frame 16 and at their lower ends to the arms of the lower spiders. It is to be understood, of course, that the structure illustrated at the right of Fig. 2, which is the front end of the machine, is duplicated at the rear end of the machine. This construction allows the car to be hung as near the ground as an under-slung chassis without any of the disadvantages of such construction. Owing to the fact that the body frame is mounted at two points so as to rock laterally independently of its supporting springs 13, the body frame may yield, or either axle may yield, without imparting any sudden shock to the axle springs over a rough road, and without requiring the use of shock absorbers.

The body frame 16 is rigid, being practically a truss frame, and since said frame is supported at two points only, it does not matter if the engine is connected to said frame at any number of points, because the frame itself cannot twist, or get out of line. The balancing springs 21 are entirely independent of the supporting spring 13 and therefore no movement can be transmitted through the supporting springs 13 to the body frame 16.

While I have illustrated the frame 16 in Fig. 1 as pointed at front and rear, it is to be understood that this is merely a selection of design and I do not limit myself thereto. Said frame 16 may have any desired shape. The axles and the spiders and the frame 16 may have any desired shape to secure the support of the engine and carriage body at such height above the ground as may be desired.

I claim:—

1. A motor vehicle having a single rigid body frame mounted at two points below the body supported by said frame to rock laterally independently of its supporting springs, and means for balancing said frame.

2. A motor vehicle having a single rigid body frame mounted at two points below the body supported by said frame above its supporting springs and capable of rocking laterally on said two points, and balancing springs independent of the supporting springs.

3. A motor vehicle having its axles provided with spring-supported yokes located below the vehicle body, a single rigid body frame provided with yokes at its front and rear ends, above the first-mentioned yokes, and a rocking connection between each pair of upper and lower yokes.

4. A motor vehicle having its axles provided with spring-supported yokes located below the body of the vehicle, a single body frame provided with yokes at its front and rear ends, above the first-mentioned yokes below said body, a rocking connection between each pair of upper and lower yokes, and balancing springs to hold the body frame normally horizontal.

5. A motor vehicle including its axles and wheels, and a single substantially rigid frame supporting the body and engine of the vehicle, rocking connections being provided between said frame and each axle substantially midway between the ends of the axles and below the body of the vehicle, whereby the entire structure above the axles and wheels is supported at two points to rock laterally.

6. A motor vehicle including its axles and wheels, and a single substantially rigid frame having pointed front and rear ends, and supporting the body and engine of the vehicle, rocking connections being provided between said frame and each axle substantially midway between the ends of the axles and below the body of the vehicle, whereby the entire structure above the axles and wheels is supported at two points to rock laterally.

7. A motor vehicle including its axles and wheels, a single substantially rigid frame supporting the body and engine of the vehicle, a yoke carried by each axle, a yoke at each end of said frame, rocking connections between the two yokes at each end of the vehicle and substantially midway between the ends of the axles, whereby the entire structure above the axles and wheels is supported at two points to rock laterally.

8. A motor vehicle having its body provided with a single frame having two rocking bearings upon the axles disposed longitudinally of the vehicle and substantially midway between the sides thereof.

In testimony whereof I have affixed my signature, in presence of two witnesses.

BENJAMIN C. LORING.

Witnesses:
A. W. HARRISON,
P. W. PEZZETTI.